US012668425B2

(12) United States Patent
Zhou et al.

(10) Patent No.: US 12,668,425 B2
(45) Date of Patent: Jun. 30, 2026

(54) GOODS PROCESSING METHOD AND APPARATUS, DEVICE, SYSTEM, STORAGE MEDIUM, AND PROGRAM PRODUCT

(71) Applicant: HAI ROBOTICS CO., LTD., Shenzhen (CN)

(72) Inventors: Lang Zhou, Shenzhen (CN); Suimei Yang, Shenzhen (CN)

(73) Assignee: HAI ROBOTICS CO., LTD., Shenzhen (CN)

( * ) Notice: Subject to any disclaimer, the term of this patent is extended or adjusted under 35 U.S.C. 154(b) by 411 days.

(21) Appl. No.: 18/339,660

(22) Filed: Jun. 22, 2023

(65) Prior Publication Data

US 2023/0331483 A1      Oct. 19, 2023

Related U.S. Application Data

(63) Continuation of application No. PCT/CN2021/136026, filed on Dec. 7, 2021.

(30) Foreign Application Priority Data

Dec. 24, 2020    (CN) .......................... 202011548986.8

(51) Int. Cl.
　　*B65G 1/137*　　　(2006.01)
　　*G06Q 10/087*　　(2023.01)

(52) U.S. Cl.
　　CPC ......... *B65G 1/1371* (2013.01); *G06Q 10/087* (2013.01)

(58) Field of Classification Search
　　CPC ...... B65G 1/1371; B65G 1/10; B65G 1/1375; B65G 1/1378; G06Q 10/087

(Continued)

(56) References Cited

U.S. PATENT DOCUMENTS 5,734,574 A　　　3/1998　Yamashita et al.
2017/0129704 A1　5/2017　Okazaki et al.
　　　　　(Continued)

FOREIGN PATENT DOCUMENTS

AU　　　2018282330 A1　　1/2019
CN　　　　1157949 A　　8/1997
　　　　　(Continued)

OTHER PUBLICATIONS

Trab, Sourour et al. A Hybrid Decision-Making-Aided Process for Classified Products Warehousing. 2018 15th International Multi-Conference on Systems, Signals & Devices (SSD), 2018. (Year: 2018).*

(Continued)

*Primary Examiner* — Fawaad Haider
(74) *Attorney, Agent, or Firm* — Slater Matsil, LLP

(57) ABSTRACT

Embodiments of the present disclosure provide a goods processing method and apparatus, a device, a system, a storage medium, and a program product. The method includes: determining, if to-be-stored goods exist, a target shelving unit configured for the goods to be placed according to delivery information corresponding to the goods; transmitting a goods placement instruction, so that a goods transport robot places the goods on the target shelving unit according to the goods placement instruction; and transmitting a goods taking instruction if to-be-retrieved goods exist, so that a shelving unit transport robot transports, to a retrieval point, a shelving unit where the to-be-retrieved goods are located.

8 Claims, 5 Drawing Sheets

(58) Field of Classification Search
USPC ........................................................ 700/214
See application file for complete search history.

(56) References Cited

U.S. PATENT DOCUMENTS

| | | | |
|---|---|---|---|
| 2018/0127212 A1* | 5/2018 | Jarvis ................... | B65G 1/1375 |
| 2020/0218245 A1 | 7/2020 | Gu et al. | |
| 2020/0286032 A1 | 9/2020 | Bogolea et al. | |
| 2020/0334625 A1 | 10/2020 | Li | |

FOREIGN PATENT DOCUMENTS

| | | |
|---|---|---|
| CN | 101458512 A | 6/2009 |
| CN | 105383843 A | 3/2016 |
| CN | 106429157 A | 2/2017 |
| CN | 106494812 A | 3/2017 |
| CN | 108116829 A | 6/2018 |
| CN | 109389348 A | 2/2019 |
| CN | 109592280 A | 4/2019 |
| CN | 109784805 A | 5/2019 |
| CN | 110182527 A | 8/2019 |
| CN | 110255045 A | 9/2019 |
| CN | 110482089 A | 11/2019 |
| CN | 110599075 A | 12/2019 |
| CN | 110949923 A | 4/2020 |
| CN | 111091322 A | 5/2020 |
| CN | 111429073 A | 7/2020 |
| CN | 111746992 A | 10/2020 |
| CN | 111891624 A | 11/2020 |
| CN | 112678409 A | 4/2021 |
| DE | 10125790 A1 | 11/2002 |
| JP | H10194411 A | 7/1998 |
| JP | 2001261125 A | 9/2001 |
| JP | 2006036456 A | 2/2006 |
| JP | 2011051784 A | 3/2011 |
| WO | WO2018196525 A1 | 11/2018 |
| WO | 2019154445 A2 | 8/2019 |

OTHER PUBLICATIONS

International Search Report and Written Opinion mailed Jan. 27, 2022; PCT/CN2021/136026.

Author: Caie Wang; Book:Warehousing and Storage Activities; Published: Jul. 31, 2013; Related pages: pp. 113; Publishing Press: China Fortune Press.

Author: Zhou Quanshen; Book: Modern logistics engineering technology and equipment; Published: Apr. 30, 2016; Related pages: p. 251-253; Publishing Press: China Fortune Press.

"Rejection Decision for Chinese Patent Application No. 202011548986. 8", Sep. 24, 2021, Total pp. 42.

"Notice of Allowance for Chinese Patent Application No. 202011548986.8", Jan. 22, 2024, Total pp. 14.

Editorial Department of Logistics Technology and Application, "Collection of Case Studies on Logistics Operations in China and Abroad", China Materials Publishing House, p. 138, May 31, 2006, Total pp. 06.

Xu Lingling et al., "Storage Technique", China Materials Publishing House, p. 74, Sep. 30, 2010, Total pp. 06.

Fu Liping, "Warehouse and Distribution Management", Guangdong Higher Education Press, pp. 358-359, Sep. 30, 2017, Total pp. 08.

Wang Jia et al., "Automated Stereoscopic Warehouse Planning Scheme", Yizhong Technology, pp. 27-32, 19, Feb. 28, 2017, Total pp. 14.

* cited by examiner

Determine, if to-be-stored goods exist, a target shelving unit configured for the goods to be placed according to delivery information corresponding to the goods   301

Transmit a goods placement instruction, so that a goods transport robot places the goods on the target shelving unit according to the goods placement instruction   302

Transmit a goods taking instruction if to-be-retrieved goods exist, so that a shelving unit transport robot transports, to a retrieval point, a shelving unit where the to-be-retrieved goods are located   303

FIG. 3

Convey goods to a storage section through a conveying line   401

A goods transport robot docks for storage   402

The goods transport robot places the goods on a shelving unit   403

A server dispatches a shelving unit transport robot to go to a target shelving unit   404

The shelving unit transport robot retrieves the shelving unit as a whole   405

FIG. 4

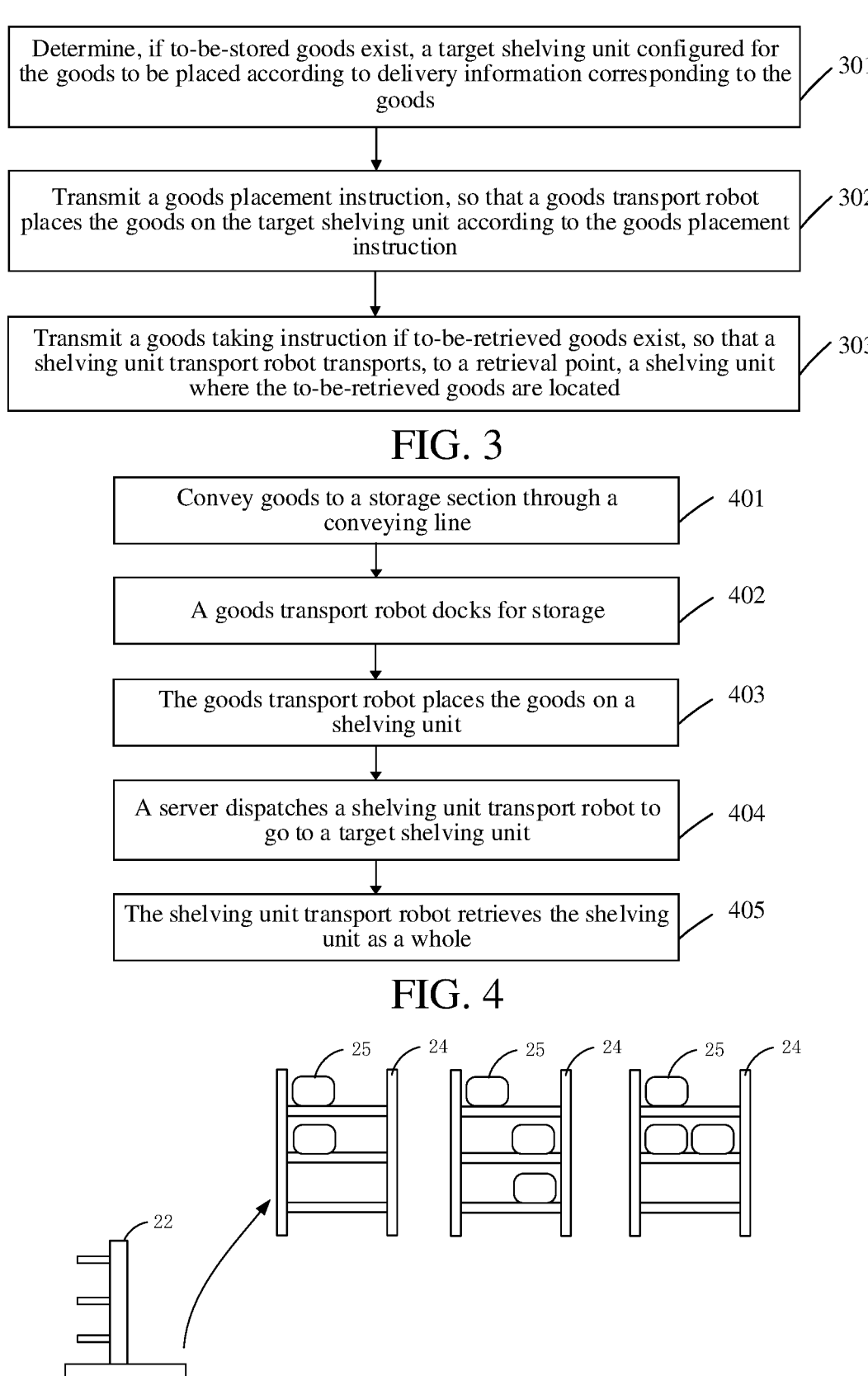

FIG. 5

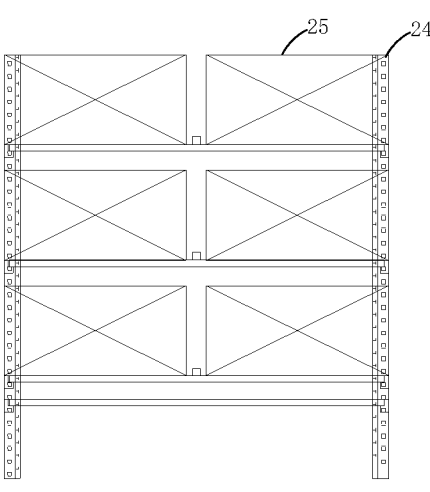

FIG. 8B

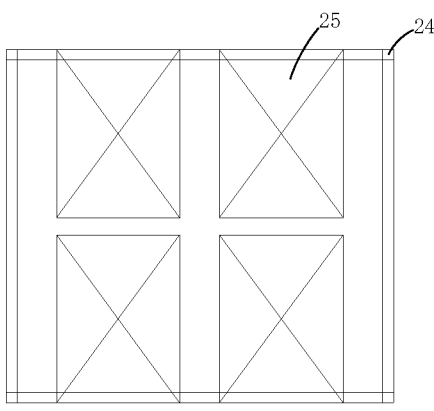

FIG. 8C

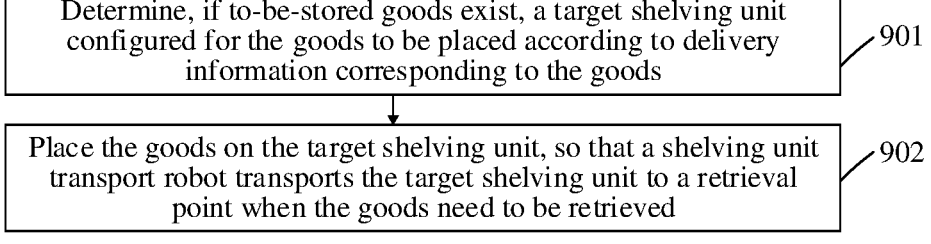

| | |
|---|---|
| Determine, if to-be-stored goods exist, a target shelving unit configured for the goods to be placed according to delivery information corresponding to the goods | 901 |
| Place the goods on the target shelving unit, so that a shelving unit transport robot transports the target shelving unit to a retrieval point when the goods need to be retrieved | 902 |

FIG. 9

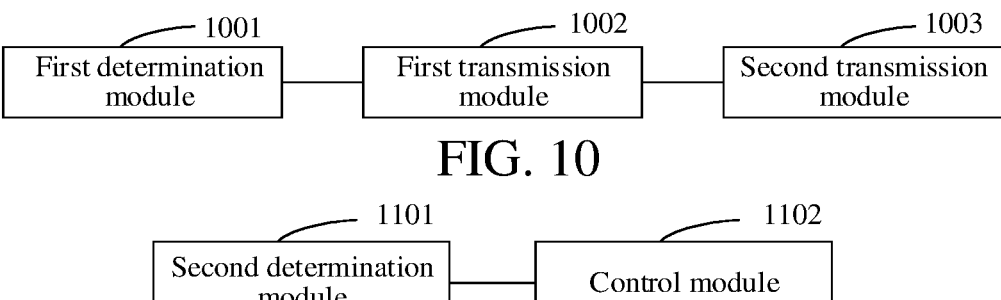

First determination module — 1001

First transmission module — 1002

Second transmission module — 1003

FIG. 10

Second determination module — 1101

Control module — 1102

FIG. 11

GOODS PROCESSING METHOD AND APPARATUS, DEVICE, SYSTEM, STORAGE MEDIUM, AND PROGRAM PRODUCT

CROSS-REFERENCE TO RELATED APPLICATIONS

The present disclosure is a continuation of International Patent Application No. PCT/CN2021/136026 filed on Dec. 7, 2021, which claims priority to Chinese Patent Application No. 202011548986.8, filed with the China National Intellectual Property Administration on Dec. 24, 2020 and entitled "GOODS PROCESSING METHOD AND APPARATUS, DEVICE, SYSTEM, STORAGE MEDIUM, AND PROGRAM PRODUCT", which are incorporated herein by references in their entirety.

TECHNICAL FIELD

The present disclosure relates to the field of intelligent warehousing, and in particular, to a goods processing method and apparatus, a device, a system, a storage medium, and a program product.

BACKGROUND

With the continuous development of intelligent warehousing technologies, there are also increasing social demands for warehousing. How to ensure fast retrieval of goods has become a hot issue.

In the current intelligent warehousing system, the goods are not placed in a specific order during placement of the goods on shelves. During retrieval of the goods, the goods need to be transported to a workstation for sorting, and then the sorted goods are delivered to a goods collection area for secondary sorting. Therefore, the retrieval process of the goods requires sorting and transport a plurality of times, which is costly and inefficient, consumes a lot of manpower, material resources, and time, and has low goods processing efficiency.

SUMMARY

Embodiments of the present disclosure provide a goods processing method and apparatus, a device, a system, a storage medium, and a program product, so as to solve the technical problem of relatively low goods processing efficiency.

According to a first aspect, an embodiment of the present disclosure provides a goods processing method, applicable to a server. The method includes:

determining, if to-be-stored goods exist, a target shelving unit for the to-be-stored goods to be placed according to delivery information corresponding to the to-be-stored goods;

transmitting a goods placement instruction, so that a goods transport robot places the to-be-stored goods on the target shelving unit according to the goods placement instruction; and transmitting a goods taking instruction if to-be-retrieved goods exist, so that a shelving unit transport robot transports, to a retrieval point, a shelving unit where the to-be-retrieved goods are located.

In a possible design, goods placed on a same shelving unit correspond to same delivery information; and the delivery information includes at least one of a retrieval point, a delivery vehicle number, or a delivery route.

In a possible design, the determining a target shelving unit for the to-be-stored goods to be placed according to delivery information corresponding to the to-be-stored goods includes:

determining an order to which the to-be-stored goods belong; and determining the target shelving unit for the to-be-stored goods to be placed according to delivery information corresponding to the order.

In a possible design, each shelving unit for the to-be-stored goods to be placed includes a plurality of shelving unit layers; and correspondingly, the method further includes: determining, according to customer information corresponding to the order, a shelving unit layer in the target shelving unit for the to-be-stored goods to be placed.

In a possible design, goods placed on a same shelving unit layer of each of at least one shelving unit corresponding to same delivery information correspond to same customer information.

In a possible design, the method further includes:

determining a docking port to which the to-be-stored goods are conveyed through a conveying line, where the to-be-stored goods are sorted goods; and correspondingly, the goods placement instruction is used for indicating the docking port to which the to-be-stored goods are conveyed and the target shelving unit, so that the goods transport robot goes to the docking port and transports the to-be-stored goods at the docking port to the target shelving unit according to the goods placement instruction.

In a possible design, the method further includes:

planning a path for the goods transport robot according to a placement position of the target shelving unit and an available path of the goods transport robot; and/or planning a path for the shelving unit transport robot according to a placement position of the shelving unit where the to-be-retrieved goods are located and an available path of the shelving unit transport robot.

In a possible design, the available path of the goods transport robot and the available path of the shelving unit transport robot do not overlap.

In a possible design, the goods transport robot is a double-depth robot, a shelving unit for the goods to be placed is a double-depth shelving unit, an aisle on one side of the shelving unit is the available path of the goods transport robot, and an aisle on an other side is the available path of the shelving unit transport robot.

In a possible design, the determining a target shelving unit for the to-be-stored goods to be placed according to delivery information corresponding to the goods includes:

searching for a shelving unit corresponding to the delivery information and having an unoccupied goods position, and selecting the target shelving unit from the found shelving unit if the shelving unit corresponding to the delivery information and having an unoccupied goods position exists; and searching for an unoccupied shelving unit if the shelving units corresponding to the delivery information and having the unoccupied goods position does not exist, and selecting the target shelving unit from the unoccupied shelving units if the unoccupied shelving unit exist.

According to a second aspect, an embodiment of the present disclosure provides a goods processing method, applicable to a goods transport robot. The method includes:

determining, if to-be-stored goods exist, a target shelving unit for the to-be-stored goods to be placed according to delivery information corresponding to the to-be-stored goods;

placing the to-be-stored goods on the target shelving unit, so that a shelving unit transport robot transports the target shelving unit to a retrieval point when the goods need to be retrieved.

In a possible design, goods placed on a same shelving unit correspond to same delivery information; and the delivery information includes at least one of a retrieval point, a delivery vehicle number, or a delivery route.

In a possible design, the determining a target shelving unit for the to-be-stored goods to be placed according to delivery information corresponding to the to-be-stored goods includes:

determining an order to which the to-be-stored goods belong; and determining the target shelving unit for the to-be-stored goods to be placed according to delivery information corresponding to the order.

In a possible design, each shelving unit for the to-be-stored goods to be placed includes a plurality of shelving unit layers; and correspondingly, the method further includes: determining, according to customer information corresponding to the order, a shelving unit layer in the target shelving unit for the to-be-stored goods to be placed.

In a possible design, goods placed on a same shelving unit layer of each of at least one shelving unit corresponding to same delivery information correspond to same customer information.

In a possible design, the placing the to-be-stored goods on the target shelving unit includes:

determining a docking port to which the to-be-stored goods are conveyed through a conveying line, where the to-be-stored goods are sorted goods; and going to the docking port and transporting the to-be-stored goods at the docking port to the target shelving unit.

In a possible design, the method further includes:

planning a goods placement path according to a placement position of the target shelving unit and an available path of the goods transport robot.

In a possible design, the available path of the goods transport robot and the available path of the shelving unit transport robot do not overlap.

In a possible design, the goods transport robot is a double-depth robot, a shelving unit for the goods to be placed is a double-depth shelving unit, an aisle on one side of the shelving unit is the available path of the goods transport robot, and an aisle on an other side is the available path of the shelving unit transport robot.

In a possible design, the determining a target shelving unit for the to-be-stored goods to be placed according to delivery information corresponding to the goods includes:

searching for a shelving unit corresponding to the delivery information and having an unoccupied goods position, and selecting the target shelving unit from the found shelving unit if shelving unit corresponding to the delivery information and having an unoccupied goods position exists; and searching for an unoccupied shelving units if the shelving units corresponding to the delivery information and having the unoccupied goods position does not exist, and selecting the target shelving unit from the unoccupied shelving units if the unoccupied shelving unit exists.

According to a third aspect, an embodiment of the present disclosure further provides a goods processing apparatus, applicable to a server. The apparatus includes:

a first determination module, configured to determine, when to-be-stored goods exist, a target shelving unit for the to-be-stored goods to be placed according to delivery information corresponding to the to-be-stored goods;

a first transmission module, configured to transmit a goods placement instruction, so that a goods transport robot places the to-be-stored goods on the target shelving unit according to the goods placement instruction; and a second transmission module, configured to transmit a goods taking instruction when to-be-retrieved goods exist, so that a shelving unit transport robot transports, to a retrieval point, a shelving unit where the to-be-retrieved goods are located.

According to a fourth aspect, an embodiment of the present disclosure provides a goods processing apparatus, applicable to a goods transport robot. The apparatus includes:

a second determination module, configured to determine, if to-be-stored goods exist, a target shelving unit for the to-be-stored goods to be placed according to delivery information corresponding to the to-be-stored goods; and a control module, configured to control the goods transport robot to place the to-be-stored goods on the target shelving unit, so that a shelving unit transport robot transports the target shelving unit to a retrieval point when the goods need to be retrieved.

According to a fifth aspect, an embodiment of the present disclosure provides a server, including:

at least one processor, and a memory, communicatively connected to the at least one processor, where the memory stores instructions executable by the at least one processor, and the instructions are executed by the at least one processor, so that the server performs the method according to any of the first aspect.

According to a sixth aspect, an embodiment of the present disclosure provides a goods transport robot, including:

at least one processor, and a memory, communicatively connected to the at least one processor, where the memory stores instructions executable by the at least one processor, and the instructions are executed by the at least one processor, so that the goods transport robot performs the method according to any of the second aspect.

According to a seventh aspect, an embodiment of the present disclosure provides a warehousing system, including: the server according to the fifth aspect, a goods transport robot, and a shelving unit transport robot.

The goods transport robot is configured to transport goods, and the shelving unit transport robot is configured to transport a shelving unit.

According to an eighth aspect, an embodiment of the present disclosure provides a warehousing system, including: the goods transport robot according to the sixth aspect, a server, and a shelving unit transport robot.

The server is configured to dispatch the goods transport robot and the shelving unit transport robot, and the shelving unit transport robot is configured to transport a shelving unit.

According to a ninth aspect, an embodiment of the present disclosure provides a computer-readable storage medium. The computer-readable storage medium stores computer-executable instructions, where the computer-executable instructions, when executed by a processor, implement the method according to any of the first aspect or any of the second aspect.

According to a tenth aspect, an embodiment of the present disclosure provides a computer program product, including a computer program. The computer program, when executed by a processor, implements the method according to any of the first aspect or any of the second aspect.

According to the goods processing method and apparatus, the device, the system, the storage medium, and the program product provided in the embodiments of the present disclosure, when to-be-stored goods exist, the target shelving unit configured for the goods to be placed may be determined according to the delivery information corresponding to the goods, and the goods placement instruction is transmitted, so that the goods transport robot places the goods on the target shelving unit according to the goods placement instruction. When to-be-retrieved goods exist, a goods taking instruction may be transmitted, so that the shelving unit transport robot transports the shelving unit where the to-be-retrieved goods are located to the retrieval point, thereby realizing the placement of the goods according to the delivery information. The whole shelving unit is directly transported according to the delivery information during retrieval without goods transport and sorting a plurality of times. In this way, the number of goods transport and sorting times is effectively reduced, thereby improving the efficiency of goods retrieval.

BRIEF DESCRIPTION OF THE DRAWINGS

In order to more clearly describe technical solutions in the embodiments of the present disclosure or in the prior art, the following briefly describes the accompanying drawings required for describing the embodiments or the prior art. Apparently, the accompanying drawings in the following description show some of the embodiments of the present disclosure, and a person of ordinary skill in the art may still derive other accompanying drawings from these accompanying drawings without any creative effort.

FIG. 3 is a schematic flowchart of a goods processing method according to an embodiment of the present disclosure.

FIG. 4 is a schematic flowchart of another goods processing method according to an embodiment of the present disclosure.

FIG. 5 is a schematic diagram of a principle of goods storage according to an embodiment of the present disclosure.

FIG. 8B is a side view of the double-depth shelving unit shown in FIG. 8A.

FIG. 8C is a top view of the double-depth shelving unit shown in FIG. 8A.

FIG. 9 is a schematic flowchart of still another goods processing method according to an embodiment of the present disclosure.

FIG. 10 is a schematic structural diagram of a goods processing apparatus according to an embodiment of the present disclosure.

FIG. 11 is a schematic structural diagram of another goods processing apparatus according to an embodiment of the present disclosure.

DETAILED DESCRIPTION

In order to make the objectives, technical solutions, and advantages of the present disclosure clearer, the technical solutions in the embodiments of the present disclosure are to be described clearly and completely with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure without creative efforts shall fall within the protection scope of the present disclosure.

In the field of intelligent warehousing, the goods processing efficiency is of great significance for the whole warehousing system. In some technologies, in order to improve the retrieval efficiency, a manner of goods collection and sorting may be adopted to realize the goods retrieval.

Figure 1:
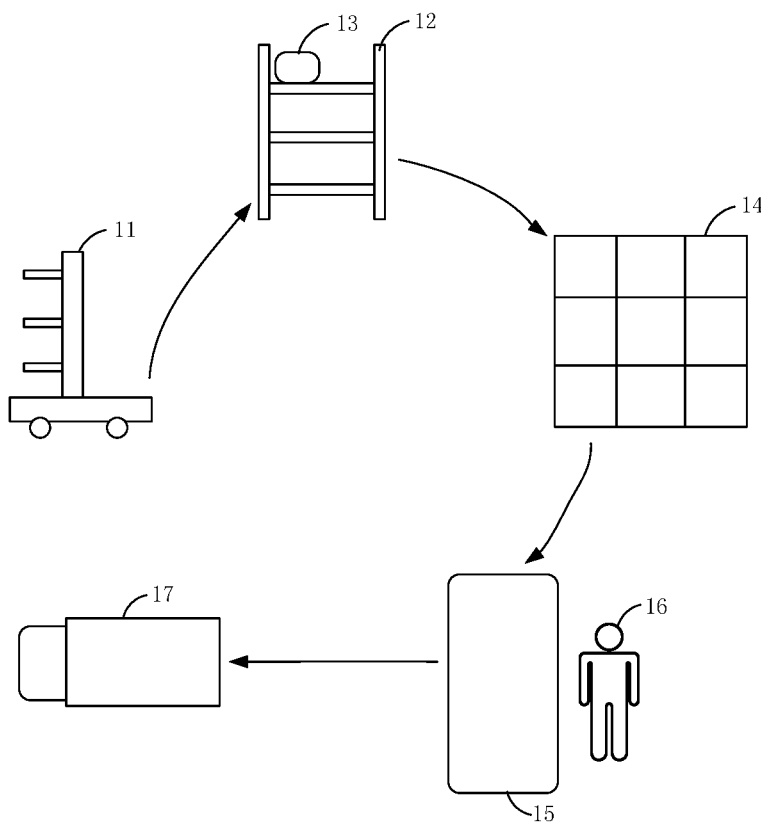
FIG. 1 is a schematic diagram of a goods retrieving process according to an embodiment of the present disclosure.

FIG. 1 is a schematic diagram of a goods retrieval process according to an embodiment of the present disclosure. Arrows in the figure show a flow direction of the goods. As shown in FIG. 1, when retrieval is required, a robot 11 may go to a shelving unit 12, take out a goods box 13 loaded with goods, and convey the goods box 13 to a workstation 14 for sorting. Upon completion of the sorting, a batch of goods corresponding to a plurality of orders are obtained. Then the robot 11 conveys the batch of goods to a goods collection area 15, and a worker 16 performs secondary sorting, selects and packages goods corresponding to each order and delivers the goods to a delivery vehicle 17 for delivery.

In the goods retrieval process, a process of transporting and sorting a plurality of times is required, resulting in relatively low retrieval efficiency. In addition, goods are generally stacked flat on the ground during goods collection, and the goods collection area has a low storage density, a limited number of goods collection positions, and relatively high land occupation costs.

In view of the above, according to the embodiment of the present disclosure, the to-be-stored goods may be placed in accordance with delivery information corresponding to the goods, and the goods with the same delivery information may be placed on the same shelving unit. The whole shelving unit may be directly transported to a retrieval point during retrieval. Since the goods with the same delivery information are placed on the shelving unit, the loading efficiency of the goods can be effectively improved. In addition, the robot can transport the goods on the whole shelving unit to the retrieval point at a time, which reduces a number of goods transport times and improves the retrieval efficiency. In addition, an additional goods collection area is not required, which effectively reduces the land occupation cost.

Figure 2:
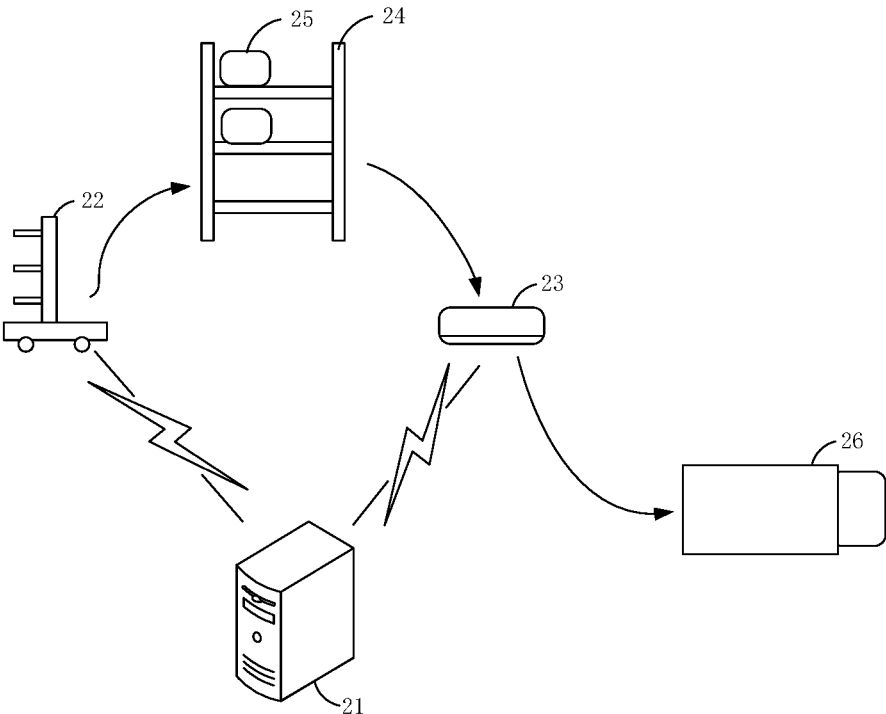
FIG. 2 is a schematic diagram of an application scenario according to an embodiment of the present disclosure.

FIG. 2 is a schematic diagram of an application scenario according to an embodiment of the present disclosure. As shown in FIG. 2, in the embodiment of the present disclosure, an intelligent warehousing system may include a server 21, a goods transport robot 22, a shelving unit transport robot 23, a shelving unit 24, and the like.

The shelving unit 24 may be configured for goods 25 to be placed. The goods transport robot 22 is configured to transport the goods 25, and may be specifically a robot with a fork or a mechanical arm that may place the goods 25 on the shelving unit 24. The shelving unit transport robot 23 is configured to transport the shelving unit 24, and may be specifically a robot that can directly jack up and carry away the shelving unit 24.

The goods transport robot 22 and the shelving unit transport robot 23 may respectively communicate with the server 21. The server 21 may transmit an instruction to the goods transport robot 22 and the shelving unit transport robot 23 to realize control of the goods transport robot 22 and the shelving unit transport robot 23.

When the goods 25 need to be placed, the server 21 may transmit, to the goods transport robot 22, the instruction for placement of the goods 25, and the goods transport robot 22 may transport to-be-stored goods 25 to a target shelving unit 24 and store the goods 25 on the shelving unit 24. The target shelving unit 24 of the goods 25 may be determined by the delivery information corresponding to the goods. For example, the goods 25 belonging to vehicles having a same delivery vehicle number may be placed on the same shelving unit 24.

When the goods 25 need to be retrieved, the server 21 determines the shelving unit 24 corresponding to the goods according to the to-be-retrieved goods 25, and transmits, to the shelving unit transport robot 23, the instruction used for transporting the shelving unit 24. The shelving unit transport robot 23 transports the corresponding shelving unit 24 to the retrieval point, and a worker or a robot loads the goods 25 on the shelving unit onto a corresponding delivery vehicle 26, so as to complete the retrieval of the goods 25.

Some implementations of the present disclosure are described in detail below with reference to the accompanying drawings. The following embodiments and features in the embodiments may be combined with each other in a case that no conflict occurs among embodiments.

FIG. 3 is a schematic flowchart of a goods processing method according to an embodiment of the present disclosure. An execution body of the method in this embodiment may be a server. As shown in FIG. 2, the goods processing method provided in this embodiment may include the following steps.

Step 301: Determine, if to-be-stored goods exist, a target shelving unit configured for the goods to be placed according to delivery information corresponding to the goods.

The goods may mean an unpacked original commodity, a packed package or goods box loaded with commodities, or the like. The to-be-stored goods may be goods to be placed on the shelving unit.

When goods need to be placed, the server may allocate the corresponding shelving unit to the goods according to the delivery information of the goods, which is denoted as a target shelving unit.

The delivery information may include at least one of a retrieval point, a delivery vehicle number, or a delivery route. The retrieval point is a loading port, which may mean a place where the goods are loaded during retrieval. The delivery vehicle number may mean a vehicle number corresponding to the vehicle delivering the goods. The delivery route may mean a delivery route corresponding to the vehicle.

In order to improve the efficiency of goods retrieval and delivery, a plurality of retrieval points corresponding to a plurality of delivery vehicle numbers and delivery routes may be set. The goods are conveyed to the corresponding retrieval point during the retrieval, loaded onto a vehicle having a corresponding delivery vehicle number, and delivered according to the corresponding delivery route.

Optionally, the delivery information corresponding to each shelving unit may be preset. The server may store a correspondence between an identifier of the shelving unit and the delivery information. When the target shelving unit is determined for the goods according to the delivery information, the corresponding shelving unit can be directly searched according to the delivery information corresponding to the goods. Alternatively, the correspondence between the shelving unit and the delivery information may be dynamically adjusted. This is not limited in the embodiment of the present disclosure.

Step 302: Transmit a goods placement instruction, so that a goods transport robot places the goods on the target shelving unit according to the goods placement instruction.

the goods placement instruction may include information about the goods and information about the target shelving unit, for example, identifiers of the goods, current positions of the goods, an identifier of the target shelving unit, a position of the target shelving unit, and the like. The goods transport robot may go to the current position of the goods according to the goods placement instruction, place the goods on a storage unit thereof, transport the goods to the position of the target shelving unit, and place the goods on the target shelving unit, so as to complete the placement operation.

Step 303: Transmit a goods taking instruction if to-be-retrieved goods exist, so that a shelving unit transport robot transports, to a retrieval point, a shelving unit where the to-be-retrieved goods are located.

The goods taking instruction may include information about the shelving unit where the goods are located, for example, a position of the shelving unit, an identifier of the shelving unit, and the like. The shelving unit transport robot may transport the whole shelving unit to the retrieval point according to the goods taking instruction. Since the goods are placed according to the delivery information, the whole shelving unit is transported to better adapt to a scene of goods delivery, thereby improving the efficiency of goods retrieval.

Upon completion of the loading of goods, the shelving unit transport robot may further transport an unoccupied shelving unit back to a corresponding position in a warehouse to realize the flow of the unoccupied shelving unit.

Optionally, the goods placed on the same shelving unit correspond to the same delivery information. The delivery information is the delivery vehicle number by way of example. The same shelving unit may be associated with the same vehicle number, that is, the goods placed on the same shelving unit correspond to the same delivery vehicle number.

Specifically, during the retrieval, the delivery vehicle is parked at the retrieval point corresponding to the delivery vehicle number, the shelving unit transport robot may directly transport the shelving unit to the retrieval point, the worker or the robot may load all goods on the shelving unit onto the delivery vehicle, and the delivery vehicle completes the delivery of the goods upon completion of the loading.

Since the same shelving unit is associated with the same delivery information, the goods transport robot places the goods according to the delivery information such as a vehicle number. Sorting is completed as long as goods are placed on the shelving unit, which reduces a number of goods sorting times. During the retrieval, fast retrieval of the whole shelving unit is realized through coordination with the shelving unit transport robot, and transportations in terms of goods are reduced. The worker does not need to confirm the information such as the vehicle number corresponding to each piece of goods respectively, which saves the time of the loading and effectively improves the overall processing efficiency of the goods.

According to the goods processing method provided in this embodiment, when to-be-stored goods exist, the target shelving unit configured for the goods to be placed may be determined according to the delivery information corresponding to the goods, and the goods placement instruction is transmitted, so that the goods transport robot places the goods on the target shelving unit according to the goods placement instruction. When to-be-retrieved goods exist, a goods taking instruction may be transmitted, so that the shelving unit transport robot transports the shelving unit where the to-be-retrieved goods are located to the retrieval point, thereby realizing the placement of the goods according to the delivery information. The whole shelving unit is directly transported according to the delivery information during retrieval without goods transport and sorting a plurality of times. In this way, the number of goods transport and sorting times is effectively reduced, thereby improving the efficiency of goods retrieval.

FIG. 4 is a schematic flowchart of another goods processing method according to an embodiment of the present disclosure. As shown in FIG. 4, the method includes the following steps.

Step 401: A conveying line conveys goods to a storage section.

In order to further improve efficiency, a conveying line may be used in this embodiment for coordination to realize storage. The conveying line may convey the goods into the storage section, and the storage section may be provided with a docking port for a goods transport robot to take away the goods.

Step 402: The goods transport robot docks for storage.

Specifically, the goods transport robot may directly take away the goods from the docking port of the conveying line.

Optionally, a plurality of docking ports may be arranged, and the server may first determine, before transmitting a goods placement instruction, the docking port to which the to-be-stored goods are conveyed by the conveying line. Correspondingly, the goods placement instruction may be used for indicating the docking port to which the goods are conveyed and a target shelving unit, so that the goods transport robot goes to the docking port and transports the goods at the docking port to the target shelving unit according to the goods placement instruction.

For example, if the conveying line conveys goods to a first docking port, the server may instruct the goods transport robot to go to the first docking port to take away the corresponding goods and place the goods on a target shelving unit.

Optionally, the to-be-stored goods are sorted goods. The sorting means that original commodities are sorted according to an order, to obtain goods corresponding to the order. The sorting of goods may be completed on the conveying line, may be completed before the conveying line, or may be completed at a manufacturer of the goods. This is not limited in the embodiment of the present disclosure.

The storage of goods can be realized more quickly through the conveying line, thereby improving the storage efficiency of goods. In addition, the goods conveyed by the conveying line may be the sorted goods. The sorted goods may be directly placed on the shelving unit, which improves the processing efficiency of the goods transport robot.

Step 403: The goods transport robot places the goods on the shelf.

Specifically, the target shelving unit for the goods to be placed may be determined according to the delivery information corresponding to the goods.

Optionally, the determining a target shelving unit for the goods to be placed according to delivery information corresponding to the goods may include: determining an order to which the goods belong; and determining the target shelving unit configured for the goods to be placed according to delivery information corresponding to the order.

The order may include an order placement time, customer information, a deadline, and the like. The corresponding delivery information may be determined according to the order. For example, the corresponding delivery route may be determined according to the customer information, and a time point at which the retrieval or delivery needs to be completed may be determined according to the order placement time or the deadline, so as to select the vehicle number that meets the requirements. In this way, the delivery information can be quickly and accurately determined according to the order corresponding to the goods, thereby improving the efficiency and accuracy of goods processing.

FIG. 5 is a schematic diagram of a principle of goods storage according to an embodiment of the present disclosure. As shown in FIG. 5, a goods transport robot 22 may place goods 25 on a shelving unit 24. A plurality of shelving units 24 may be arranged in a warehouse, and the goods 25 placed on the same shelving unit 24 may correspond to the same delivery information. Different shelving units 24 may correspond to different delivery information or may correspond to the same delivery information. For example, the shelving unit 24 on a left side and the shelving unit 24 in the middle of the figure correspond to a vehicle number A, and the shelving unit 24 on a right side corresponds to a vehicle number B.

When the goods 25 need to be delivered by the vehicle number A, the goods 25 may be placed on the shelving unit 24 on the left side and the shelving unit 24 in the middle. When the goods 25 need to be delivered by the vehicle number B, the goods 25 may be placed on the shelving unit 24 on the right side.

Optionally, each of the shelving units 24 configured for the goods 25 to be placed may include a plurality of shelving unit layers, thereby realizing multi-layer three-dimensional storage, improving space utilization, and increasing a quantity of goods positions.

In a case that each shelving unit 24 includes a plurality of shelving unit layers, the shelving unit layer in the target shelving unit 24 configured for the to-be-stored goods 25 to be placed may further be determined according to customer information corresponding to the order.

Each delivery vehicle number/delivery route may correspond to at least one piece of customer information, and the customer information may be a name, a number, an address, and the like of a customer. Specifically, during travelling along the delivery route, the vehicle may go to a site of one customer (such as a store), unload the corresponding goods 25 from the vehicle and deliver the goods to the customer, and then continue to go to a site of a next customer until all of the goods 25 in the vehicle are delivered.

In order to match a delivery mode in which each piece of delivery information corresponds to the at least one piece of customer information, the goods 25 may be placed on the shelving unit layer according to the customer information. Therefore, during loading of the goods 25, the worker can conveniently arrange the goods 25 according to the customer information, which effectively improves the efficiency of delivery.

Optionally, goods placed on the same shelving unit layer of each of at least one shelving unit corresponding to the same delivery information correspond to the same customer information.

As shown in FIG. 5, each shelving unit 24 has three layers, and the shelving unit layer on which the goods 25 are placed may be determined according to the customer information. The goods 25 of the same customer are placed on each shelving unit layer. For example, goods 25 of a customer a are placed on a top layer of the shelving unit 24, goods 25 of a customer b are placed on a middle layer, and goods 25 of a customer c are placed on a bottom layer.

In addition, not only the same layer of one shelving unit 24 corresponds to the same customer information, and if two or more shelving units 24 correspond to the same delivery information, the same layer of the two or more shelving units 24 may also correspond to the same customer information.

For example, the shelving unit layers corresponding to the shelving unit 24 on the left side and the shelving unit 24 in the middle of the vehicle number A both correspond to the same customer information. For example, the top layer of the shelving unit 24 on the left side and the top layer of the shelving unit 24 in the middle both correspond to the customer a. The shelving unit 24 corresponding to different vehicle numbers may not be subject to this restriction. For example, the same layer of the shelving unit 24 on the left side and the shelving unit 24 on the right side may correspond to different customer information.

According to the above goods placement method, during the retrieval and loading of the goods, the worker can directly determine the corresponding customer information according to the shelving unit layer without spending an extra time to determine the corresponding customer information for each piece of goods, which further improves the efficiency and accuracy of the loading and delivery.

Step 404: The server dispatches a shelving unit transport robot to go to the target shelving unit.

The server may dispatch, according to a loading rhythm, the shelving unit transport robot to go to the target shelving unit by transmitting corresponding instructions.

Step 405: The shelving unit transport robot is retrieved as a whole.

The shelving unit transport robot may transport the target shelving unit to the loading port according to the instructions of the server.

Figure 6:
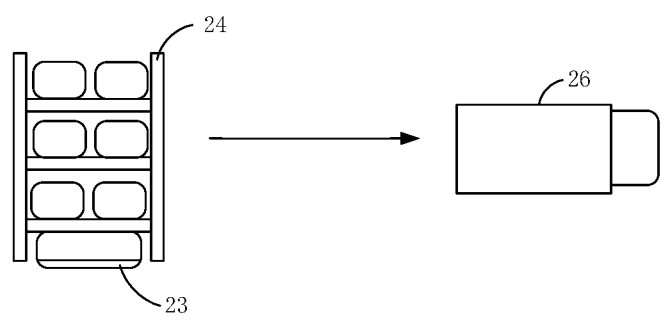
FIG. 6 is a schematic diagram of a principle of goods retrieval according to an embodiment of the present disclosure.

FIG. 6 is a schematic diagram of a principle of goods retrieval according to an embodiment of the present disclosure. As shown in FIG. 5, the shelving unit transport robot 23 may jack up the whole shelving unit 24 and transport the shelving unit to the loading port, and place the shelving unit on a delivery vehicle 26 for delivery.

According to the goods processing method provided in this embodiment, the storage and retrieval of goods can be realized through the cooperation of the conveying line, the goods transport robot, the shelving unit transport robot, and the like, thereby effectively reducing a number of goods transport times and improving the processing efficiency of the goods.

A specific implementation that the same shelving unit corresponds to the same delivery information and the same shelving unit layer corresponds to the same customer information is given above. On this basis, a correspondence among the shelving unit, the shelving unit layer, the delivery information, and the customer information may also be adjusted according to actual requirements. For example, the same shelving unit may be configured for goods of two adjacent vehicle numbers to be placed, which can take into account the storage efficiency of goods on the basis of improving the efficiency of retrieval, thereby improving the overall performance of the system.

Based on the technical solution provided in the above embodiment, optionally, a path may be further planned for the goods transport robot according to a placement position of the target shelving unit and an available path of the goods transport robot, and/or a path is planned for the shelving unit transport robot according to a placement position of the shelving unit where the to-be-retrieved goods are located and an available path of the shelving unit transport robot.

Figure 7:
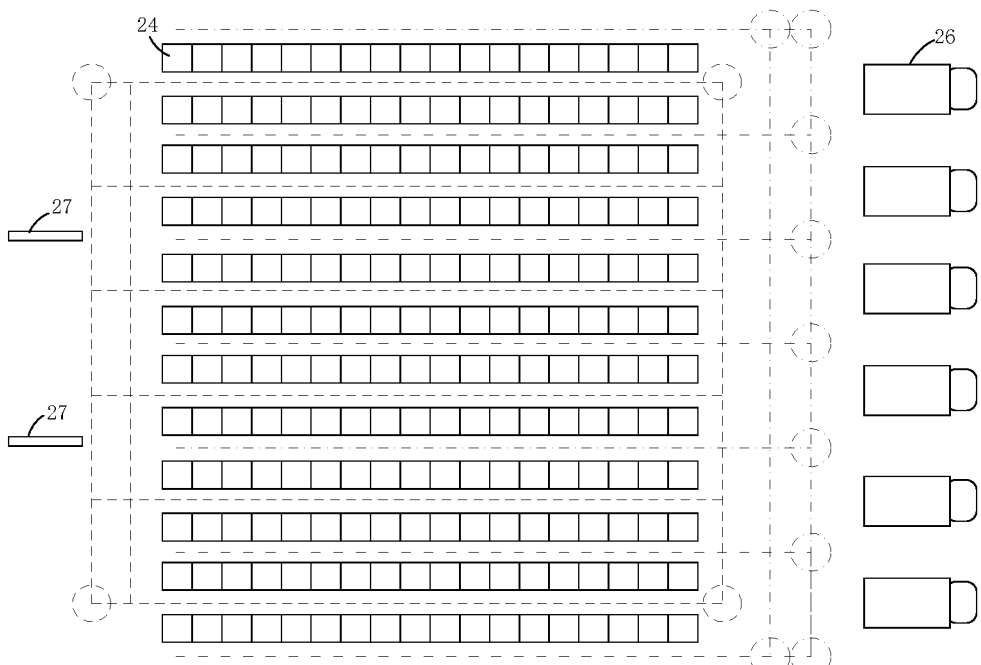
FIG. 7 is a schematic diagram of an available path according to an embodiment of the present disclosure.

FIG. 7 is a schematic diagram of an available path according to an embodiment of the present disclosure. As shown in FIG. 7, a shelving unit area may be arranged between a conveying line 27 and a delivery vehicle 26, a plurality of rows of shelving units 24 are placed in the shelving unit area, and the available paths of the goods transport robot and the shelving unit transport robot are formed between the rows of shelving units 24.

Dashed lines in the figure represent the available paths of the goods transport robot, and dot dash lines represent the available paths of the shelving unit transport robot. During the transport of the goods, the path corresponding to the goods transport this time may be selected from the available paths of the goods transport robot. During the transport of the shelving units, the path corresponding to the shelving unit transport this time may be selected from the available paths of the shelving unit transport robot.

By configuring different available paths for the robots with different functions, the path planning of the goods transport robot and the shelving unit transport robot can be realized quickly and effectively, thereby improving the efficiency of the path planning and saving computing resources.

Optionally, the available path of the goods transport robot and the available path of the shelving unit transport robot do not overlap, thereby effectively reducing the traffic congestion caused by the path overlapping and improving the efficiency of goods taking and placing of the robot.

Optionally, the goods transport robot may be a double-depth robot, the shelving unit configured for the goods to be placed may be a double-depth shelving unit, an aisle on one side of the shelving unit is the available path of the goods transport robot, and an aisle on an other side is the available path of the shelving unit transport robot.

The double-depth shelving unit may mean that the goods on each shelving unit layer may be placed in double rows in a depth direction. The depth direction may mean a direction in which a fork telescopes when the robot takes or places the goods.

Figure 8A:
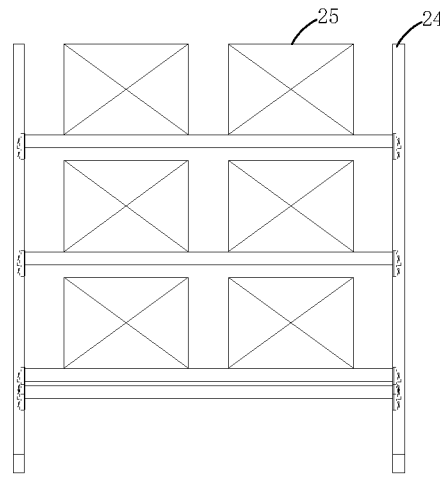
FIG. 8A is a front view of a double-depth shelving unit according to an embodiment of the present disclosure.

FIG. 8A is a front view of a double-depth shelving unit according to an embodiment of the present disclosure. FIG.

8B is a side view of the double-depth shelving unit shown in FIG. 8A. FIG. 8C is a top view of the double-depth shelving unit shown in FIG. 8A.

As shown in FIG. 8A to FIG. 8C, a shelving unit 24 may include three layers. Two pieces of goods 25 may be placed on each layer in both the depth direction and a width direction, so that 2×2×3=12 goods 25 may be placed on one shelving unit 24, which further increases the quantity of goods positions and the space utilization.

The double-depth robot may be a robot that can place goods to two depths, that is, the robot can take out two pieces of goods at a time. Optionally, a storage unit of the robot may also be a double-depth storage unit, and two pieces of goods may be placed on one layer of the storage unit.

The double-depth robot is used in conjunction with the double-depth shelving unit, so as to directly complete the double-depth goods placement, thereby avoiding the need to place goods on both sides of the shelving unit, and improving the efficiency of goods placement. In addition, aisles on two sides of the shelving unit may be respectively used by the goods transport robot and the shelving unit transport robot, which can effectively realize non-overlapping of the available paths of the goods transport robot and the shelving unit transport robot, and ensure the smooth and orderly operation of the system.

Based on the technical solution provided in the above embodiment, optionally, the determining a target shelving unit for the goods to be placed according to delivery information corresponding to the goods may include: searching for shelving units corresponding to the delivery information and having an unoccupied goods position, and selecting the target shelving unit from the found shelving units if the shelving units are found; and searching for unoccupied shelving units if the shelving units corresponding to the delivery information and having the unoccupied goods position are not found, and selecting the target shelving unit from the unoccupied shelving units if the unoccupied shelving units are found.

Specifically, when goods are to be stored, the delivery information of the goods may be determined first, then the shelving unit corresponding to the delivery information and having been partially occupied is searched, and the goods are placed on the shelving unit.

If the shelving units corresponding to the delivery information are all occupied, or no shelving unit corresponds to the delivery information, an unoccupied shelving unit is selected. That is to say, no shelving unit for any goods to be placed is currently used as a shelving unit corresponding to the delivery information, and to-be-stored goods are placed on the shelving unit. When new goods need to be placed subsequently, the new goods may be placed on the shelving unit if the delivery information satisfies the requirements of the shelving unit. After the goods on the shelving unit are all retrieved, a correspondence between the shelving unit and the delivery information may be released so that the shelving unit is available to subsequent goods as an unoccupied shelving unit.

Through the method for determining the target shelving unit according to the delivery information described above, a shelving unit can be selected first from the shelving units having delivery information matched for placing the to-be-stored goods, which effectively reduces the vacancy rate of the shelving unit, improves the degree of concentration of retrieval through the shelving units, and optimizes the retrieval efficiency.

FIG. 9 is a schematic flowchart of still another goods processing method according to an embodiment of the present disclosure. The method described in this embodiment may be applied to a goods transport robot. As shown in FIG. 9, the method includes the following steps.

Step 901: Determine, if to-be-stored goods exist, a target shelving unit configured for the goods to be placed according to delivery information corresponding to the goods.

Step 902: Place the goods on the target shelving unit, so that a shelving unit transport robot transports the target shelving unit to a retrieval point when the goods need to be retrieved.

A difference between this embodiment and the foregoing embodiment is that a process of determining the target shelving unit according to the delivery information is performed by the goods transport robot. For the specific implementation principle and process, reference may be made to the above embodiment, and the details are not described herein again.

In this embodiment, the server may dispatch the goods transport robot and the shelving unit transport robot. Specifically, when the to-be-stored goods exist, the server may transmit an instruction to the goods transport robot to indicate the to-be-stored goods, and the goods transport robot determines the target shelving unit according to the delivery information of the goods and places the goods on the target shelving unit.

The goods transport robot may transmit a correspondence among the goods, the delivery information, and the target shelving unit to the server after placing the goods, and the server stores the correspondence. When the goods need to be retrieved, the server determines the corresponding target shelving unit according to the to-be-retrieved goods and transmits the instruction to the shelving unit transport robot, so that the shelving unit transport robot can transport the whole target shelving unit to the retrieval point.

According to the goods processing method provided in this embodiment, when to-be-stored goods exist, a target shelving unit configured for the goods to be placed is determined according to the delivery information corresponding to the goods, and the goods are placed on the target shelving unit, so that the shelving unit transport robot transports the target shelving unit to the retrieval point when the goods need to be retrieved, thereby realizing the placement of the goods according to the delivery information. The whole shelving unit is directly transported according to the delivery information during retrieval without goods transport and sorting a plurality of times. In this way, a number of goods transport and sorting times is effectively reduced, thereby improving the efficiency of goods retrieval.

In an optional implementation, the goods placed on the same shelving unit correspond to the same delivery information.

The delivery information includes at least one of the retrieval point, a delivery vehicle number, or a delivery route.

In an optional implementation, the determining a target shelving unit configured for the goods to be placed according to delivery information corresponding to the goods includes:

determining an order to which the goods belong; and determining the target shelving unit configured for the goods to be placed according to delivery information corresponding to the order.

In an optional implementation, each shelving unit configured for the goods to be placed includes a plurality of shelving unit layers.

Correspondingly, the method further includes: determining, according to customer information corresponding to the order, a shelving unit layer in the target shelving unit configured for the to-be-stored goods to be placed.

In an optional implementation, goods placed on the same shelving unit layer of each of at least one shelving unit corresponding to the same delivery information correspond to the same customer information.

In an optional implementation, the placing the goods on the target shelving unit includes:

determining a docking port to which the to-be-stored goods are conveyed through a conveying line, where the to-be-stored goods are sorted goods; and going to the docking port and transporting the goods at the docking port to the target shelving unit.

In an optional implementation, the method further includes:

planning a goods placement path according to a placement position of the target shelving unit and an available path of the goods transport robot.

In an optional implementation, the available path of the goods transport robot and the available path of the shelving unit transport robot do not overlap.

In an optional implementation, the goods transport robot is a double-depth robot, a shelving unit configured to store the goods is a double-depth shelving unit, an aisle on one side of the shelving unit is the available path of the goods transport robot, and an aisle on an other side is the available path of the shelving unit transport robot.

In an optional implementation, the determining a target shelving unit configured for the goods to be placed according to delivery information corresponding to the goods includes:

searching for shelving units corresponding to the delivery information and having an unoccupied goods position, and selecting the target shelving unit from the found shelving units if the shelving units are found; and searching for unoccupied shelving units if the shelving units corresponding to the delivery information and having the unoccupied goods position are not found, and selecting the target shelving unit from the unoccupied shelving units if the unoccupied shelving units are found.

For the specific implementation principle, process, and effect of the goods processing method provided in this embodiment, reference may be made to the foregoing embodiments, and the details are not described herein again.

FIG. 10 is a schematic structural diagram of a goods processing apparatus according to an embodiment of the present disclosure. The apparatus is applicable to a server. As shown in FIG. 10, the apparatus may include:

a first determination module 1001, configured to determine, when to-be-stored goods exist, a target shelving unit configured for the goods to be placed according to delivery information corresponding to the goods;

a first transmission module 1002, configured to transmit a goods placement instruction, so that a goods transport robot places the goods on the target shelving unit according to the goods placement instruction; and a second transmission module 1003, configured to transmit a goods taking instruction when to-be-retrieved goods exist, so that a shelving unit transport robot transports, to a retrieval point, the shelving unit where the to-be-retrieved goods are located.

According to the goods processing apparatus provided in this embodiment, when to-be-stored goods exist, the target shelving unit configured for the goods to be placed may be determined according to the delivery information corresponding to the goods, and the goods placement instruction is transmitted, so that the goods transport robot places the goods on the target shelving unit according to the goods placement instruction. When to-be-retrieved goods exist, a goods taking instruction may be transmitted, so that the shelving unit transport robot transports the shelving unit where the to-be-retrieved goods are located to the retrieval point, thereby realizing the placement of the goods according to the delivery information. The whole shelving unit is directly transported according to the delivery information during retrieval without goods transport and sorting a plurality of times. In this way, the number of goods transport and sorting times is effectively reduced, thereby improving the efficiency of goods retrieval.

In an optional implementation, the goods placed on the same shelving unit correspond to the same delivery information.

The delivery information includes at least one of the retrieval point, a delivery vehicle number, or a delivery route.

In an optional implementation, during the determination of the target shelving unit configured for the goods to be placed according to the delivery information corresponding to the goods, the first determination module 1001 is further configured to:

determine an order to which the goods belong; and determine the target shelving unit configured for the goods to be placed according to delivery information corresponding to the order.

In an optional implementation, each shelving unit configured for the goods to be placed includes a plurality of shelving unit layers.

Correspondingly, the first determination module 1001 is further configured to: determine, according to customer information corresponding to the order, a shelving unit layer in the target shelving unit configured for the to-be-stored goods to be placed.

In an optional implementation, goods placed on the same shelving unit layer of each of at least one shelving unit corresponding to the same delivery information correspond to the same customer information.

In an optional implementation, the first determination module 1001 is further configured to:

determine a docking port to which the to-be-stored goods are conveyed through a conveying line, where the to-be-stored goods are sorted goods; and correspondingly, the goods placement instruction is used for indicating the docking port to which the goods are conveyed and the target shelving unit, so that the goods transport robot goes to the docking port and transports the goods at the docking port to the target shelving unit according to the goods placement instruction.

In an optional implementation, the first determination module 1001 is further configured to:

plan a path for the goods transport robot according to a placement position of the target shelving unit and an available path of the goods transport robot; and/or plan a path for the shelving unit transport robot according to a placement position of the shelving unit where the to-be-retrieved goods are located and an available path of the shelving unit transport robot.

In an optional implementation, the available path of the goods transport robot and the available path of the shelving unit transport robot do not overlap.

In an optional implementation, the goods transport robot is a double-depth robot, a shelving unit configured to store the goods is a double-depth shelving unit, an aisle on one side of the shelving unit is the available path of the goods transport robot, and an aisle on an other side is the available path of the shelving unit transport robot.

In an optional implementation, during the determination of the target shelving unit configured for the goods to be placed according to the delivery information corresponding to the goods, the first determination module 1001 is further configured to:

search for shelving units corresponding to the delivery information and having an unoccupied goods position, and select the target shelving unit from the found shelving units if the shelving units are found; and search for unoccupied shelving units if the shelving units corresponding to the delivery information and having the unoccupied goods position are not found, and select the target shelving unit from the unoccupied shelving units if the unoccupied shelving units are found.

The apparatus provided in this embodiment may be configured to execute the technical solutions of the method embodiments shown in FIG. 1 to FIG. 8. The implementation principles and technical effects thereof are similar, and the details are not described herein again.

FIG. 11 is a schematic structural diagram of another goods processing apparatus according to an embodiment of the present disclosure. The apparatus is a goods transport robot. As shown in FIG. 11, the apparatus may include:

a second determination module 1101, configured to determine, when to-be-stored goods exist, a target shelving unit configured for the goods to be placed according to delivery information corresponding to the goods; and a control module 1102, configured to control the goods transport robot to place the goods on the target shelving unit, so that a shelving unit transport robot transports the target shelving unit to a retrieval point when the goods need to be retrieved.

According to the goods processing apparatus provided in this embodiment, when to-be-stored goods exist, a target shelving unit configured for the goods to be placed is determined according to the delivery information corresponding to the goods, and the goods are placed on the target shelving unit, so that the shelving unit transport robot transports the target shelving unit to the retrieval point when the goods need to be retrieved, thereby realizing the placement of the goods according to the delivery information. The whole shelving unit is directly transported according to the delivery information during retrieval without goods transport and sorting a plurality of times. In this way, a number of goods transport and sorting times is effectively reduced, thereby improving the efficiency of goods retrieval.

In an optional implementation, the goods placed on the same shelving unit correspond to the same delivery information.

The delivery information includes at least one of the retrieval point, a delivery vehicle number, or a delivery route.

In an optional implementation, during the determination of the target shelving unit configured for the goods to be placed according to the delivery information corresponding to the goods, the second determination module 1101 is further configured to:

determine an order to which the goods belong; and determine the target shelving unit configured for the goods to be placed according to delivery information corresponding to the order.

In an optional implementation, each shelving unit configured for the goods to be placed includes a plurality of shelving unit layers.

Correspondingly, the second determination module 1101 is further configured to: determine, according to customer information corresponding to the order, a shelving unit layer in the target shelving unit configured for the to-be-stored goods to be placed.

In an optional implementation, goods placed on the same shelving unit layer of each of at least one shelving unit corresponding to the same delivery information correspond to the same customer information.

In an optional implementation, the control module 1102 is further configured to:

determine a docking port to which the to-be-stored goods are conveyed through a conveying line, where the to-be-stored goods are sorted goods; and control the goods transport robot to go to the docking port and transport the goods at the docking port to the target shelving unit, so that the shelving unit transport robot transports the target shelving unit to a retrieval point when the goods need to be retrieved.

In an optional implementation, the second determination module 1101 is further configured to:

plan a goods placement path according to a placement position of the target shelving unit and an available path of the goods transport robot.

In an optional implementation, the available path of the goods transport robot and the available path of the shelving unit transport robot do not overlap.

In an optional implementation, the goods transport robot is a double-depth robot, a shelving unit configured to store the goods is a double-depth shelving unit, an aisle on one side of the shelving unit is the available path of the goods transport robot, and an aisle on an other side is the available path of the shelving unit transport robot.

In an optional implementation, during the determination of the target shelving unit configured for the goods to be placed according to the delivery information corresponding to the goods, the second determination module 1101 is further configured to:

search for shelving units corresponding to the delivery information and having an unoccupied goods position, and select the target shelving unit from the found shelving units if the shelving units are found; and search for unoccupied shelving units if the shelving units corresponding to the delivery information and having the unoccupied goods position are not found, and select the target shelving unit from the unoccupied shelving units if the unoccupied shelving units are found.

The apparatus provided in this embodiment may be configured to execute the technical solutions of the method embodiments shown in FIG. 9. The implementation principles and technical effects thereof are similar, and the details are not described herein again.

Figure 12:
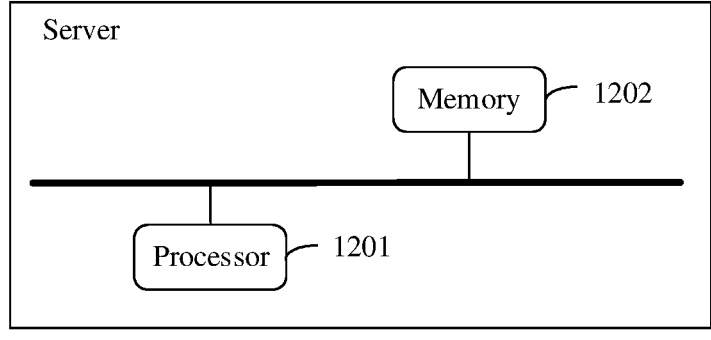
FIG. 12 is a schematic structural diagram of a server according to an embodiment of the present disclosure.

FIG. 12 is a schematic structural diagram of a server according to an embodiment of the present disclosure. As shown in FIG. 12, the server in this embodiment may include:

at least one processor 1201; and a memory 1202, communicatively connected to the at least one processor, where the memory 1202 stores instructions executable by the at least one processor 1201, and the instructions are executed by the at least one processor 1201, so that the server performs the method according to any of the above embodiments.

Optionally, the memory 1202 may be either independent, or may be integrated with the processor 1201.

For the implementation principle and technical effects of the server provided in this embodiment, reference may be made to the foregoing embodiments, and the details are not described herein again.

Figure 13:
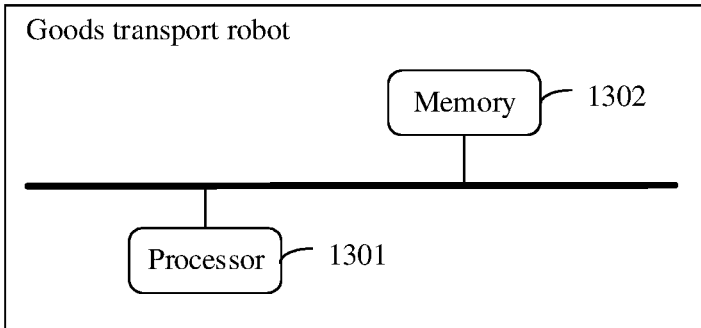
FIG. 13 is a schematic structural diagram of a goods transport robot according to an embodiment of the present disclosure.

FIG. 13 is a schematic structural diagram of a goods transport robot according to an embodiment of the present disclosure. As shown in FIG. 13, the goods transport robot provided in this embodiment may include:

at least one processor 1301; and a memory 1302, communicatively connected to the at least one processor, where the memory 1302 stores instructions executable by the at least one processor 1301, and the instructions are executed by the at least one processor 1301, so that the goods transport robot performs the method according to any of the above embodiments.

Optionally, the memory 1302 may be either independent, or may be integrated with the processor 1301.

For the implementation principle and the technical effect of the goods transport robot provided in this embodiment, reference may be made to the foregoing embodiments, and the details are not described herein again.

An embodiment of the present disclosure further provides a warehousing system, including a server shown in FIG. 12, a goods transport robot, and a shelving unit transport robot.

The goods transport robot is configured to transport goods, and the shelving unit transport robot is configured to transport a shelving unit.

For the implementation principle and technical effects of the warehousing system provided in this embodiment, reference may be made to the embodiments shown in FIG. 1 to FIG. 8, and the details are not described herein again.

An embodiment of the present disclosure further provides a warehousing system, including a goods transport robot shown in FIG. 13, a server, and a shelving unit transport robot.

The server is configured to dispatch the goods transport robot and the shelving unit transport robot, and the shelving unit transport robot is configured to transport a shelving unit.

For the implementation principle and the technical effect of the warehousing system provided in this embodiment, reference may be made to the embodiment shown in in to FIG. 9, and the details are not described herein again.

An embodiment of the present disclosure further provides a computer-readable storage medium. The computer-readable storage medium stores computer-executable instructions, where the computer-executable instructions, when executed by a processor, implement the method according to any of the above embodiments.

An embodiment of the present disclosure further provides a computer program product, including a computer program. The computer program, when executed by a processor, implements the method according to any of the above embodiments.

In the several embodiments provided in the present disclosure, it should be understood that the disclosed device and method may be implemented in other manners. For example, the device embodiments described above are merely exemplary. For example, division of modules is merely logical function division and may be other division manners during actual implementation. For example, a plurality of modules may be combined or integrated into another system, or some features may be omitted or not executed. In addition, the displayed or discussed mutual coupling or direct coupling or communication connections may be implemented by some interfaces. The indirect coupling or communication connection between the apparatuses or modules may be electrical, mechanical, or in other forms.

The modules described as separate components may or may not be physically separated, and the components displayed as modules may or may not be physical units, which may be located in one place or may be distributed on a plurality of network units. Some or all of the modules may be selected according to actual needs to implement the solutions of this embodiment.

In addition, functional modules in the embodiments of the present disclosure may be integrated into one processing unit, or each module may exist alone physically, or two or more modules may be integrated into one unit. The unit integrated by the modules may be implemented in the form of hardware, or may be implemented in the form of hardware and a software function unit.

The above integrated module in the form of software functional modules may be stored in one computer-readable storage medium. The software function module is stored in a storage medium and includes several instructions for causing a computer device (which may be a personal computer, a server, a network device, or the like) or a processor to perform some steps of the method described in the embodiments of the present disclosure.

It should be understood that the processor may be a central processing unit (CPU), and may further be other general-purpose processors, a digital signal processor (DSP), an application specific integrated circuit (ASIC), and the like. The general-purpose processor may be a microprocessor, or may be any conventional processor, or the like. The steps of the methods disclosed with reference to the present invention may be directly performed by a hardware processor, or may be performed by using a combination of hardware and software modules in the processor.

The memory may include a high-speed RAM memory, or may include a non-volatile storage NVM, for example, at least one disk memory, a USB flash disk, a mobile hard disk drive, a read-only memory, a magnetic disk, an optical disc, or the like.

The bus may be an industry standard architecture (ISA for short) bus, a peripheral component interconnect (PCI for short) bus, or an extended industry standard architecture (EISA for short) bus, and the like. The bus may be divided into an address bus, a data bus, a control bus, and the like. For ease of representation, the bus in the accompanying drawings of the present disclosure is not limited to only one bus or one type of bus.

The storage medium may be implemented by any type of volatile or non-volatile storage devices or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disc, or an optical disc. The storage medium may be any available medium accessible to a general-purpose or special-purpose computer.

For example, an exemplary storage medium is coupled to a processor, so that the processor can read information from the storage medium or write information into the storage medium. Certainly, the storage medium may be a component of the processor. The processor and the storage medium may be located in the ASIC. Certainly, the processor and the storage medium may also exist in an electronic device or a master device as a discrete component.

A person of ordinary skill in the art may understand that all or some of the steps of the method embodiments may be performed by a program instructing relevant hardware. The program may be stored in a computer-readable storage medium. When the program is executed, steps of the foregoing method embodiments are performed. The foregoing storage medium includes various media such as a ROM, a RAM, a magnetic disk, an optical disk, or the like that can store program code.

Finally, it should be noted that the foregoing embodiments are merely used for describing the technical solutions of the present disclosure, rather than limiting the present disclosure. Although the present disclosure is described in detail with reference to the foregoing embodiments, those of ordinary skill in the art should understand that the technical solutions specified in the above embodiments can still be modified, or some or all of the technical features therein can be equivalently substituted, and these modifications or replacements do not make the essence of corresponding technical solutions depart from the scope of the technical solutions of the embodiments of the present disclosure.

What is claimed is:

1. A goods processing method, applicable to a server, the method comprising:

determining a target shelving unit for to-be-stored goods to be placed according to delivery information corresponding to the to-be-stored goods, wherein the to-be-stored goods are goods that have been sorted according to an order and are to be placed on the target shelving unit, wherein the delivery information of the to-be-stored goods is already known, and wherein the delivery information comprises at least one of a retrieval point where goods are loaded during retrieval, a delivery vehicle number comprising a vehicle number corresponding to a vehicle delivering the goods, or a delivery route corresponding to the vehicle;

transmitting a goods placement instruction, so that a goods transport robot places the to-be-stored goods on the target shelving unit according to the goods placement instruction;

receiving a correspondence among goods that have been placed on the target shelving unit, the delivery information, and the target shelving unit sent by the goods transport robot;

transmitting, when the goods that have been placed on the target shelving unit are to be retrieved, a goods taking instruction to a shelving unit transport robot to cause the shelving unit transport robot to transport the target shelving unit where to-be-retrieved goods are located to the retrieval point, wherein the to-be-retrieved goods are the goods that have been placed on the target shelving unit and that need to be retrieved;

wherein the goods transport robot comprises a fork or a mechanical arm;

wherein the goods transport robot is configured to transport the goods and place the goods on a shelving unit through the fork or the mechanical arm;

wherein the shelving unit transport robot is configured to transport the shelving unit;

wherein the shelving unit transport robot is capable of jacking up and carrying away the shelving unit;

wherein goods placed on a same shelving unit correspond to the same delivery information;

wherein the goods processing method further comprises:

planning a path for the goods transport robot according to a placement position of the target shelving unit and an available path of the goods transport robot; and

planning a path for the shelving unit transport robot according to a placement position of the shelving unit where the to-be-retrieved goods are located and an available path of the shelving unit transport robot;

wherein the available path of the goods transport robot and the available path of the shelving unit transport robot do not overlap;

wherein the goods transport robot is a double-depth robot;

wherein the shelving unit for the goods to be placed is a double-depth shelving unit such that goods on each shelving unit layer are placed in double rows in a depth direction of the shelving unit;

wherein an aisle on one side of the shelving unit is the available path of the goods transport robot, and an aisle on an other side is the available path of the shelving unit transport robot;

wherein each shelving unit comprises a plurality of shelving unit layers; and wherein the double-depth robot is capable of placing goods on each row in the depth direction of the shelving unit, and the double-depth robot is used in conjunction with the double-depth shelving unit, so as to directly complete double-depth goods placement.

2. A goods processing method, applicable to a goods transport robot, the method comprising:

determining a target shelving unit for to-be-stored goods to be placed according to delivery information corresponding to the to-be-stored goods, wherein the to-be-stored goods are goods that have been sorted according to an order and are to be placed on the target shelving unit, wherein the delivery information of the to-be-stored goods is already known, and wherein the delivery information comprises at least one of a retrieval point where goods are loaded during retrieval, a delivery vehicle number comprising a vehicle number corresponding to a vehicle delivering the goods, or a delivery route corresponding to the vehicle;

receiving a goods placement instruction sent by a server;

placing the to-be-stored goods on the target shelving unit;

transmitting correspondence among goods that have been placed on the target shelving unit, the delivery information, and the target shelving unit to the server, so that when the goods that have been placed on the target shelving unit need to be retrieved, the server transmits a goods taking instruction to a shelving unit transport robot to cause the shelving unit transport robot to transport the target shelving unit to the retrieval point, wherein the to-be-retrieved goods are the goods that have been placed on the target shelving unit and that need to be retrieved;

wherein the goods transport robot comprises a fork or a mechanical arm;

wherein the goods transport robot is configured to transport the goods and place the goods on a shelving unit through the fork or the mechanical arm;

wherein the shelving unit transport robot is configured to transport the shelving unit;

wherein the shelving unit transport robot is capable of jacking up and carrying away the shelving unit;

wherein goods placed on a same shelving unit correspond to the same delivery information;

wherein the goods processing method further comprises planning a goods placement path according to a placement position of the target shelving unit and an available path of the goods transport robot;

wherein a path for the shelving unit transport robot is planned according to a placement position of the shelving unit where the to-be-retrieved goods are located and an available path of the shelving unit transport robot;

wherein the available path of the goods transport robot and the available path of the shelving unit transport robot do not overlap;

wherein the goods transport robot is a double-depth robot such that goods on each shelving unit layer are placed in double rows in a depth direction of the shelving unit;

wherein the shelving unit for the goods to be placed is a double-depth shelving unit;

wherein an aisle on one side of the shelving unit is the available path of the goods transport robot and an aisle on an other side is the available path of the shelving unit transport robot;

wherein each shelving unit comprises a plurality of shelving unit layers;

wherein the double-depth robot is capable of placing goods on each row in the depth direction of the shelving unit; and wherein the double-depth robot is used in conjunction with the double-depth shelving unit, so as to directly complete double-depth goods placement.

3. A server, comprising:

at least one processor, and a memory, communicatively connected to the at least one processor, wherein the memory is configured to store instructions executable by the at least one processor, and the instructions comprise:

determining a target shelving unit for to-be-stored goods to be placed according to delivery information corresponding to the to-be-stored goods, wherein the to-be-stored goods are goods that have been sorted according to an order and are to be placed on the target shelving unit, wherein the delivery information is already known, wherein the delivery information comprises at least one of a retrieval point where goods are loaded during retrieval, a delivery vehicle number comprising a vehicle number corresponding to a vehicle delivering the goods, or a delivery route corresponding to the vehicle;

transmitting a goods placement instruction, so that a goods transport robot places the to-be-stored goods on the target shelving unit according to the goods placement instruction;

receiving a correspondence among goods that have been placed on the target shelving unit, the delivery information, and the target shelving unit sent by the goods transport robot;

transmitting, when the goods that have been placed on the target shelving unit are to be retrieved, a goods taking instruction to a shelving unit transport robot, to cause the shelving unit transport robot to transport the target shelving unit where to-be-retrieved goods are located, to the retrieval point, wherein the to-be-retrieved goods are the goods that have been placed on the target shelving unit and that need to be retrieved;

wherein the goods transport robot comprises a fork or a mechanical arm;

wherein the goods transport robot is configured to transport the goods and place the goods on a shelving unit through the fork or the mechanical arm;

wherein the shelving unit transport robot is configured to transport the shelving unit;

wherein the shelving unit transport robot is capable of jacking up and carrying away the shelving unit;

wherein goods placed on a same shelving unit correspond to the same delivery information;

wherein the instructions further comprise at least one of:

planning a path for the goods transport robot according to a placement position of the target shelving unit and an available path of the goods transport robot; and planning a path for the shelving unit transport robot according to a placement position of the shelving unit where the to-be-retrieved goods are located and an available path of the shelving unit transport robot;

wherein the available path of the goods transport robot and the available path of the shelving unit transport robot do not overlap;

wherein the goods transport robot is a double-depth robot;

wherein the shelving unit for the goods to be placed is a double-depth shelving unit such that that goods on each shelving unit layer are placed in double rows in a depth direction of the shelving unit;

wherein an aisle on one side of the shelving unit is the available path of the goods transport robot;

wherein an aisle on an other side is the available path of the shelving unit transport robot;

wherein each shelving unit comprises a plurality of shelving unit layers;

wherein the double-depth robot is capable of placing goods on each row in the depth direction of the shelving unit; and wherein the double-depth robot is used in conjunction with the double-depth shelving unit, so as to directly complete double-depth goods placement.

4. A goods transport robot, comprising:

at least one processor, and a memory, communicatively connected to the at least one processor, wherein the memory is configured to store instructions executable by the at least one processor, and the instructions comprise:

determining a target shelving unit for to-be-stored goods to be placed according to delivery information corresponding to the to-be-stored goods, wherein the to-be-stored goods are goods that have been sorted according to an order and are to be placed on the target shelving unit, the delivery information of the to-be-stored goods is already known, wherein the delivery information comprises at least one of a retrieval point where goods are loaded during retrieval, a delivery vehicle number comprising a vehicle number corresponding to a vehicle delivering the goods, or a delivery route corresponding to the vehicle;

receiving a goods placement instruction sent by a server;

placing the to-be-stored goods on the target shelving unit; and transmitting correspondence among goods that have been placed on the target shelving unit, the delivery information, and the target shelving unit to the server, so that when the goods that have been placed on the target shelving unit need to be retrieved, the server transmits a goods taking instruction to a shelving unit transport robot to cause the shelving unit transport robot to transport the target shelving unit to the retrieval point, wherein the to-be-retrieved goods are the goods that have been placed on the target shelving unit and that need to be retrieved;

wherein the goods transport robot comprises a fork or a mechanical arm;

wherein the goods transport robot is configured to transport the goods and place the goods on a shelving unit through the fork or the mechanical arm;

wherein the shelving unit transport robot is configured to transport the shelving unit;

wherein the shelving unit transport robot is capable of jacking up and carrying away the shelving unit;

wherein goods placed on a same shelving unit correspond to the same delivery information;

wherein the instructions further comprise planning a goods placement path according to a placement position of the target shelving unit and an available path of the goods transport robot;

wherein a path for the shelving unit transport robot is planned according to a placement position of the shelving unit where the to-be-retrieved goods are located and an available path of the shelving unit transport robot;

wherein the available path of the goods transport robot and the available path of the shelving unit transport robot do not overlap;

wherein the goods transport robot is a double-depth robot, the shelving unit for the goods to be placed is a double-depth shelving unit such that goods on each shelving unit layer are placed in double rows in a depth direction of the shelving unit;

wherein an aisle on one side of the shelving unit is the available path of the goods transport robot;

wherein an aisle on an other side is the available path of the shelving unit transport robot; and wherein each shelving unit comprises a plurality of shelving unit layers;

wherein the double-depth robot is capable of placing goods on each row in the depth direction of the shelving unit; and wherein the double-depth robot is used in conjunction with the double-depth shelving unit, so as to directly complete double-depth goods placement.

5. The goods processing method according to claim 1, further comprising determining a docking port to which the to-be-stored goods are conveyed through a conveying line, wherein the goods placement instruction is used for indicating the docking port to which the to-be-stored goods are conveyed and the target shelving unit, so that the goods transport robot goes to the docking port and transports the to-be-stored goods at the docking port to the target shelving unit according to the goods placement instruction.

6. The goods processing method according to claim 1, wherein determining the target shelving unit for the to-be-stored goods to be placed according to delivery information corresponding to the goods comprises:

searching for a shelving unit corresponding to the delivery information and having an unoccupied goods position, and selecting the target shelving unit from the found shelving unit if the shelving unit corresponding to the delivery information and having an unoccupied goods position exists; and searching for an unoccupied shelving unit if the shelving unit corresponding to the delivery information and having the unoccupied goods position does not exist, and selecting the target shelving unit from the unoccupied shelving units if the unoccupied shelving unit exists.

7. The server according to claim 3, wherein the instructions further comprise determining a docking port to which the to-be-stored goods are conveyed through a conveying line, wherein the goods placement instruction is used for indicating the docking port to which the to-be-stored goods are conveyed and the target shelving unit, so that the goods transport robot goes to the docking port and transports the to-be-stored goods at the docking port to the target shelving unit according to the goods placement instruction.

8. The server according to claim 3, wherein the instructions comprise:

searching for a shelving unit corresponding to the delivery information and having an unoccupied goods position, and selecting the target shelving unit from the found shelving unit if the shelving unit corresponding to the delivery information and having an unoccupied goods position exists; and searching for an unoccupied shelving unit if the shelving unit corresponding to the delivery information and having the unoccupied goods position does not exist, and selecting the target shelving unit from the unoccupied shelving units if the unoccupied shelving unit exists.

* * * * *